INVENTORS
JOHN O. BRADFUTE
PIETER W. SNIJDERS

United States Patent Office 3,009,716
Patented Nov. 21, 1961

3,009,716
VENTURI COUPLING APPARATUS
John O. Bradfute, Los Altos, and Pieter W. Snijders, La Mesa, Calif., assignors to General Dynamics Corporation, San Diego, Calif., a corporation of Delaware
Filed Dec. 2, 1958, Ser. No. 777,759
9 Claims. (Cl. 284—18)

The present invention relates to a venturi coupling apparatus, and more particularly relates to a leak proof coupling apparatus which utilizes the reduced static pressure produced in the throat of a venturi to prevent leakage.

Advances in the field of rocket fuels, the use of liquid oxygen, and the advent of other unstable and volatile substances have produced many handling and storage problems for industry. The present invention is a coupling apparatus which permits two fluid conduits to be connected together in such a manner that no fluid leakage can occur either during the coupling operation or subsequent thereto. The coupling apparatus is particularly adapted for use with pressurized fuel tanks containing liquid oxygen or similar substances.

An object of the present invention is to provide a coupling apparatus which utilizes a venturi throat at its connecting junction point to help insure that the pressure inside the junction will be less than the pressure outside the junction.

Another object of the present invention is to provide such a coupling apparatus with a gaseously pressurized area surrounding the junction point with the pressure established in such a way that it will always be greater than pressure inside the junction.

Another object is to provide a leakproof coupling for use with gaseously pressurized liquid fuel tanks.

Other objects and features of the present invention will be readily apparent to those skilled in the art from the following specification and appended drawing wherein is illustrated a preferred form of the invention, and in which.

Figure 1:
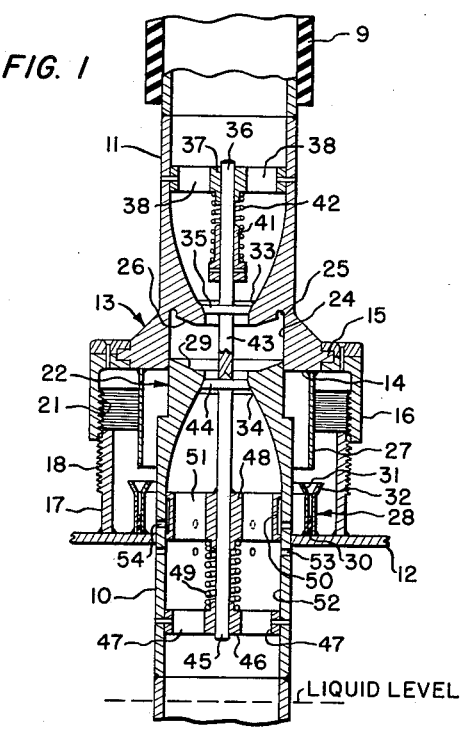
FIGURE 1 is a cross sectional view of the venturi coupling apparatus in the very initial stages of the coupling operation.

Referring now to the drawing, it is seen that the venturi coupling apparatus includes a lower pipe section 10 and an upper pipe section 11. Lower pipe section 10 is positioned through the wall 12 of a fuel tank. The fuel tank contains a liquid fuel, as indicated by "liquid level," and a pressurized inert gas. The tank is thus a conventional fuel tank for substances such as liquid oxygen. The upper pipe section 11 also contains a pressurized inert gas which is received from a hose 9 or other conduit. The gas in the tank and connecting line serve to minimize vaporization of the liquid and to provide the pressure for forcing the liquid from the tank when desired. As will be seen however, the present invention makes an additional and novel use of the gas.

Attention is first directed, however, to the construction of the apparatus. It is seen that the end 13 of upper pipe section 11 includes a flange 14. Flange 14 has an annular protrusion or extension 15 which accommodates or holds a loosely rotatable nut member 16. A cylindrical section 17 is concentrically disposed about lower pipe section 10 and attached to the exterior of fuel tank wall 12. This cylindrical section 17 has an exterior threaded portion 18, while nut member 16 has an interior threaded portion 21. These two threaded portions are mutually engageable and provide the mechanical coupling mechanism for the apparatus. The upper end 22 of lower pipe section 10 has an outer cylindrical cross section which is somewhat smaller than that of the rest of pipe section 10. Upper pipe section 11 has a well or recess 24 in its end portion 13 which is adapted to receive end portion 22 of pipe section 10. A circumferential groove 25 is disposed in the bottom of well 24. The fit between pipe section 10 and well 24 is such that gas can enter the well and reach the annular groove 25 at its bottom. The bottom surface 26 of the well 24 and the end surface 29 of lower pipe section 10 are closely mating surfaces which form a seal when firmly butted together. If desired, however, a gasket or other seal means could be used at these surfaces to further insure proper sealing.

A cylindrical skirt 27 is attached to flange 14 and protrudes therefrom to lie concentrically about pipe section 10. A skirt receptacle 28 is concentrically disposed about pipe section 10 and attached to the exterior of fuel tank wall 12. As shown, skirt receptacle 28 consists of concentric and spring like flanges 31 and 32 with a seal element 30 disposed therebetween. The cylindrical skirt 27 and skirt receptacle 28 lie between the outer coupling mechanism and the pipe sections.

The pipe sections are of generally uniform cross section save at their ends 22 and 13. The ends 22 and 13 each contain a portion of a venturi throat, which portions are designated 33 and 34. When the two pipe sections are butted together then a complete venturi throat, or flow constriction, is formed at their junction. Each pipe section contains a spring loaded valve which is movable to close or open its corresponding portion of the venturi throat. Thus, pipe section 11 contains a valve 35 mounted on an axially disposed shaft 36. This shaft 36 is held in place by a support structure 37 which has orifices 38 positioned therein to permit fluid to flow therethrough. A fitting 41 is rigidly fixed to shaft 36 and a spring 42 is compressed between this fitting and support structure 37. Spring 42 acts to keep valve 35 positioned in the venturi throat of pipe section 11. An extension 43 of valve 35 protrudes from the upper venturi throat portion toward the lower pipe section 10. Another valve 44 is disposed in lower pipe section 10. Valve 44 is mounted on an axial shaft 45, which in turn is held by shaft support structure 46. Shaft support 46 includes openings or apertures 47 through which fluid may flow.

Unlike the valve and attendant mechanism in pipe section 11, however, the valve mechanism in pipe section 10 includes a spool 48 mounted on shaft 45 and rigidly fixed thereto. A spring 49 is compressed between spool 48 and shaft support structure 46, and acts to keep valve 44 positioned in the venturi throat portion of pipe section 10. Spool 48 also has orifices indicated by numeral 51 through which fluid may flow. A substantially fluid tight seal is formed between the spool 48 and the inner wall 52 of pipe section 10. Although no O-rings are shown on the spool they may be used if desired. An annular groove 50 is disposed on spool 48 and, as will be seen, provides a passage for the inert gas of the fuel tank. Other fluid passage means are also acceptable as long as they will perform the function of the annular groove.

Adjacent spool 48 are holes 53 through the wall of pipe section 10. Holes 53 are located within the fuel tank. Similar holes 54 are positioned in the wall of pipe section 10, but these holes are exterior to the fuel tank. The purpose of these holes, the spool, and the other parts of the venturi coupling apparatus will become clear from a description of the function and operation of the invention.

FIGURE 1 shows pipe section 10 and pipe section 11 in the position of initial contact. In this position nut member 16 rests on cylindrical section 17 in preparation for their threaded engagement. At the same time, the extension 43 of upper valve 35 makes contact with the lower valve 44. Both valves, at this time, are in their closed positions in their respective venturi throat portions.

Figure 2:
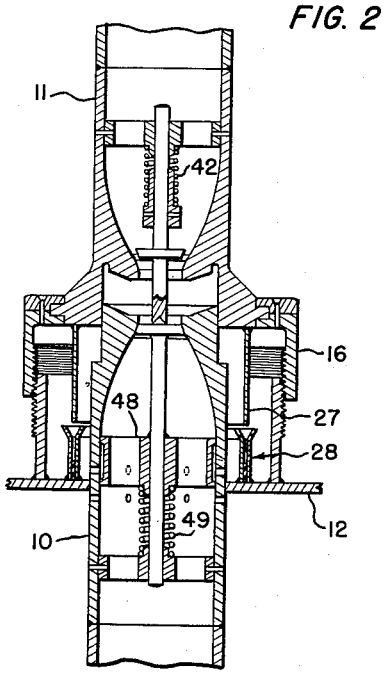
FIGURES 2, 3 and 4 show the coupling apparatus in sequentially advancing stages of the coupling operation until, as shown in FIGURE 4, the coupling operation is complete.

FIGURE 2 shows the venturi coupling apparatus with nut member 16 slightly engaged with cylindrical section 17. This threaded engagement, and the valve extension 43 disposed between the two valves, causes one of the valves to open. The spring 42 associated with valve 35 is purposely chosen weaker than spring 49 associated with lower valve 44. The effect of this is to cause upper valve 35 to open first. When valve 35 opens, the pressurized and inert gas in the upper pipe section 11 rushes out and into well 24. From here, the gas travels out to the area between cylindrical skirt 27 and the pipe section 10. And finally, the gas fills the area between the skirt 27 and the outer coupling mechanism, thus purging the entire area of all gases save the inert gas issuing from upper pipe section 11.

It should be noted that, while lower valve 44 remains closed, the spool 48 isolates or closes the exterior holes 54. Thus, no gas or liquid in the fuel tank can escape via these holes into the gaseously purged area as long as valve 44 remains closed.

Figure 3:
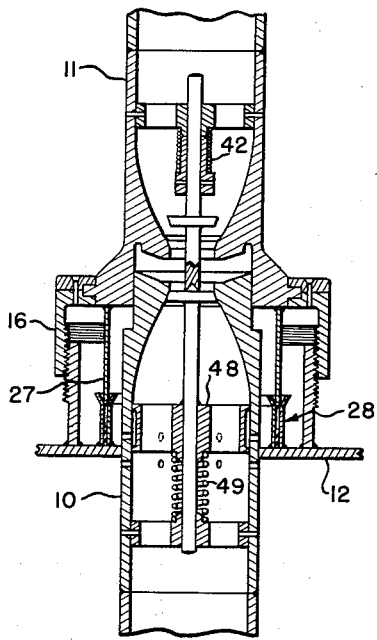

FIGURE 3 shows the nut member 16 more fully engaged with the threaded cylindrical section 17. In this position the valve 35 has been forced fully open and no more compression of spring 42 can occur. At the same time, the cylindrical skirt 27 makes initial contact with the skirt receptacle 28. The skirt and receptacle thus begin to form a seal about the junction of the two pipe sections. The area within this seal is purged of all gas save that inert gas which is issuing from the upper pipe section 11.

Figure 4:
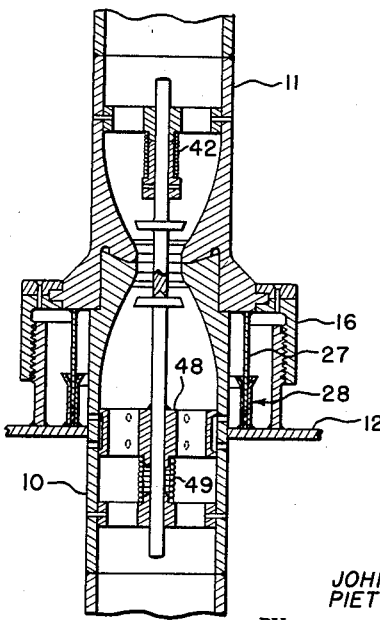

FIGURE 4 shows the nut member 16 fully engaged with the threaded cylindrical section 17. The cylindrical skirt 27 protrudes fully into skirt receptacle 28, and a substantially gas tight seal is formed about the junction of the two pipe sections. Since the upper valve 35 could no longer move, the lower valve is now forced fully open. The spool 48 is now in a position such that it provides a fluid passageway between interior holes 53 and exterior holes 54 in the side of pipe section 10. Thus, the inert and pressurized gas in the fuel tank can communicate with and pressurize the area between the pipe section 10 and the substantially gas tight seal formed by the skirt and skirt receptacle. Since the fit between end 22 of pipe section 10 and well 24 of pipe section 11 is not a gas tight fit, then the pressurized gas communicates with the annular groove 25 in the bottom of well 24. This annular groove is adjacent the actual junction point or seal area between the pipe sections and provides a gas pressure at the exterior of this junction point which is equal to that existing in the fuel tank.

With full engagement having been made, the liquid fuel in the tank can now be pumped through the venturi coupling apparatus. This is done, as is conventional, by increasing the pressure of the inert gas in the fuel tank. As the gas pressure in the fuel tank is increased the liquid fuel is forced into pipe section 10 and then through the venturi throat and into upper pipe section 11. From pipe section 11 it can be carried to the desired terminus by a suitable hose 9 or other duct means connected to upper pipe section 11. The hose 9, for most applications, should have a suitable shut off valve or the like somewherealong its length in order to instantly stop the flow of liquid therethrough when desired. This is not shown in the drawing however, as it does not form a part of the present invention and it is felt that it is not essential to an understanding thereof.

Referring still to FIGURE 4, it can be seen that the presence of the venturi throat at the pipe section junction point, coupled with the pressurized gas surrounding the exterior of the junction point, produces an unusual effect. It is well known that the pressure of a fluid flowing through a venturi constriction in a pipe is less than that pressure which exists elsewhere in the pipe in areas of normal cross section. Thus, the pressure of the liquid fuel flowing through the venturi throat is less than the pressure which exists in the rest of pipe sections 10 and 11. The liquid fuel pressure which exists in the normal areas of the pipe sections is substantially the same as the pressure of the gas in the fuel tank. This is easily seen from the fact that it is the gas pressure in the fuel tank which is forcing the liquid fuel through the pipe sections. Thus, the pressure within the venturi throat at the pipe junction is less than the pressure of the gas in the fuel tank. Since the gas in the annular groove 25 which surrounds the pipe junction is at the same pressure as the gas within the fuel tank, then it, too, is at a greater pressure than the fuel flowing through the junction point. Consequently, no fuel can escape from the junction. If any leaks occur there at all it will be leakage of the surrounding inert gas "into" the pipe sections, and not leakage of the fuel "from" the pipe sections. Even if by some very remote chance fuel should leak from the junction, it will drain back into the fuel tank via holes 54 and 53.

Thus, the present invention provides a method for connecting fluid conduits without leakage at their junction either during or after the coupling operations. As described, this is accomplished by the use of a flow constriction or venturi throat at the junction point and a means for gaseously pressuring the area around the junction of the conduits. And, while certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. A venturi coupling apparatus for use with a gaseously pressurized liquid fuel tank, said apparatus comprising a first pipe section positioned through the wall of said fuel tank and protruding therefrom on both sides, a second pipe section exterior to said tank for being coupled to said first pipe section, outer coupling means on said second pipe section and said tank for coupling said pipe sections together, a cylindrical skirt spaced between said coupling means and said pipe sections, said skirt being attached to the end of said second pipe section and protruding therefrom to lie concentrically about said first pipe section when said pipe sections are coupled together, a skirt receptacle fixed to the wall of said tank and concentrically positioned about said first pipe section, said skirt mating with said skirt receptacle and providing a substantially gas tight area about the junction of said pipe sections when said pipe sections are coupled together by said outer coupling means, said pipe sections having a venturi throat at their junction, and means for continuously opening said gas tight area to the interior of said gaseously pressurized tank when said sections are coupled whereby the pressure outside said junction will be greater than inside said junction when liquid is forced therethrough by gas pressure in the tank.

2. A venturi coupling apparatus for use with a gaseously pressurized liquid fuel tank, said apparatus comprising a first pipe section positioned through the wall of said fuel tank and protruding therefrom on both sides, a second pipe section exterior to said tank for being coupled to said first pipe section, said second pipe section including a circumferential flange at its coupling end, a nut member fitted on said flange and loosely rotatable thereon, a cylindrical section attached to said tank and positioned concentrically about said first pipe section, an interior portion of said nut member being threaded and an exterior portion of said cylindrical section being threaded, said nut member mating with said cylindrical section in threaded and telescoping relationship, a cylindrical skirt attached to said flange concentrically within said nut member, a skirt receptacle fixed to said tank wall concentrically within said cylindrical section, said skirt mating with said skirt receptacle and providing a substantially gas tight area about the junction of said pipe sections when said sections are coupled together by said nut member and cylindrical section, said pipe sections having a venturi throat at their junction, and means for connecting said gas tight area to the interior of said gaseously pressurized tank when said sections are coupled whereby the pressure outside said junction will be greater than inside said junction when liquid is forced therethrough by gas pressure in said tank.

3. A venturi coupling apparatus for use with a gaseously pressurized liquid fuel tank, said apparatus comprising a lower pipe section positioned through the wall of said fuel tank and protruding therefrom on both sides of said wall, an upper pipe section exterior to said tank for being coupled to said lower pipe section, said pipe sections having mating end portions, said pipe sections having a venturi throat at their mating junction when coupled together, a first spring biased valve in said lower pipe section, a second spring biased valve in said upper pipe section, one of said valves having an extension therein which engages the other of said valves as said pipe sections are coupled together, said valves arranged to open sequentially as said pipe sections are coupled together, said second valve opening first, a spool within said lower pipe section, said spool being beneath said first valve and connected thereto to move as said first valve opens, at least two openings in the side of said lower pipe section, one of said openings being within said tank and the other being exterior thereto, said spool isolating said exterior opening when said first valve is closed, said spool providing a fluid passage between the two openings when said first valve is open, and outer seal means arranged to provide a substantially gas tight area about said pipe section mating junction and said exterior opening when said pipe sections are coupled together.

4. A venturi coupling apparatus for use with a gaseously pressurized liquid fuel tank, said apparatus comprising a lower pipe section positioned through the wall of said fuel tank and protruding therefrom on both sides of said wall, an upper pipe section exterior to said tank for being coupled to said lower pipe section, said pipe sections having mating end portions, said pipe sections having a venturi throat at their mating junction when coupled together, a central shaft longitudinally disposed in said lower pipe section, a first spring loaded valve mounted on said shaft with said valve closing said venturi throat, a spool mounted on said shaft beneath said first valve to move with said valve, a central shaft longitudinally disposed in said upper pipe section, a second spring loaded valve mounted on said shaft with said valve closing said venturi throat, one of said valves having an extension which protrudes from the end of its pipe section, said extension engaging the other valve as said pipe sections are coupled together, said extension causing said valves to open as said pipe sections are coupled together, said valves being spring loaded to cause said second valve to open first, outer seal means arranged to provide an area about said mating junction which becomes substantially gas tight as said pipe sections are coupled together, at least two openings in the side of said lower pipe section, one of said openings being within said tank and the other being exterior thereto and opening within said gas tight area, said spool isolating said exterior opening when said first valve is closed, and said spool providing a fluid passage between the two openings when said first valve opens subsequent to the opening said second valve.

5. A leak-proof venturi coupling apparatus comprising first and second pipe sections for carrying fluids and gases under a given pressure when said sections are coupled together, said first and second pipe sections each having a portion of a venturi throat in their respective coupling ends, said pipe sections forming said venturi throat at their junction point when coupled together, valve means in each of said pipe sections for closing said sections when said sections are separated, means for sequentially opening said valve means in response to coupling said pipe sections together, means exterior to said pipe sections for providing a substantially gas-tight area about said junction of said sections when said sections are coupled together, a source of pressurized gas having a pressure exceeding said given pressure, and means for continuously admitting said pressurized gas from said source to said area.

6. A leak-proof venturi coupling apparatus for carrying liquids under pressure, comprising first and second pipe sections detachably coupled together, said pipe sections having a venturi throat at their junction point when coupled together through which said liquids pass having a given pressure, means exterior to said pipe sections for providing a substantially gas-tight area about said junction of said sections when said sections are coupled together, a source of pressurized gas exceeding said given pressure, and means for connecting said source of pressurized gas to said area for maintaining a gas pressure in said area that exceeds said given pressure.

7. A leak-proof venturi coupling apparatus for transferring liquid and gases under a given pressure therethrough, comprising first and second pipe sections detachably coupled together, said pipe sections having a venturi throat at their junction point when coupled together, valve means in each of said pipe sections for closing said sections when said sections are separated, means for sequentially opening said valve means as said pipe sections are coupled together allowing gas to flow from the first open section to purge unwanted gases from within said coupling, means exterior to said pipe sections for providing a substantially gas-tight area about said junction point when said sections are coupled together, a source of pressurized gas having a pressure exceeding said given pressure, and means connecting said source of pressurized gas to said area for maintaining a higher gas pressure in said area than said given pressure of said liquid and gases being transferred through said coupling apparatus.

8. A venturi coupling apparatus for use with gaseous pressurized liquid containing tanks, said apparatus comprising a first pipe section positioned through the wall of the said tank, a second pipe section exterior to said tank for being coupled to said first pipe section, said pipe sections having a venturi throat at their junction point when coupled together, means exterior to said pipe sections for providing a substantially gas-tight area about said junction when said pipe sections are coupled together, and means for connecting said gas-tight area to the interior of said gaseous pressurized tank in a manner that the pressure outside said junction point will be greater than inside said junction point when liquid flows therethrough and substantially no leakage can occur therefrom.

9. A venturi coupling apparatus for use with gaseously pressurized liquid containing tanks, said apparatus comprising a first pipe section positioned through the wall of a said tank and protruding therefrom on both sides, a second pipe section exterior to said tank for being coupled to said first pipe section, outer coupling means on said second pipe section and said tank for coupling said pipe sections together, outer seal means spaced between said coupling means and said pipe sections, said outer seal means circumferentially positioned about said pipe sections and providing a substantially gas-tight area between said seal means and said junction of said pipe sections when said sections are coupled together by said outer coupling means, said pipe sections having a venturi throat at said sections' junction and means for continuously opening said gas-tight area to the interior of said gaseously pressurized tank.

(References on following page)

References Cited in the file of this patent

UNITED STATES PATENTS

| | | |
|---|---|---|
| 1,590,580 | Hume | June 29, 1926 |
| 2,323,179 | Hall et al. | June 29, 1943 |
| 2,512,999 | Bruning | June 27, 1950 |
| 2,679,408 | Jacobi et al. | May 25, 1954 |
| 2,735,696 | Omon et al. | Feb. 21, 1956 |
| 2,915,325 | Foster | Dec. 1, 1959 |

FOREIGN PATENTS

| | | |
|---|---|---|
| 32,998 | Germany | Mar. 14, 1885 |